United States Patent Office
3,422,073
Patented Jan. 14, 1969

3,422,073
POLYOXYMETHYLENIC COPOLYMERS FROM TRIOXANE AND CYCLIC FORMAL
Gianfranco Pregaglia and Giancarlo Pozzi, Milan, and Paolo Roffia, Mantova, Italy, assignors to Montecatini Edison S.p.A., Milan, Italy
No Drawing. Filed Apr. 4, 1966, Ser. No. 539,653
Claims priority, application Italy, Apr. 7, 1965, 7,663/65
U.S. Cl. 260—67      13 Claims
Int. Cl. C08g *1/16*

ABSTRACT OF THE DISCLOSURE

Copolymers of trioxane and the cyclic formal 3,5,8-trioxa-bicyclo-[4,4,0]-decane, having good thermal stability, are obtained by copolymerizing a mixture of the monomers in contact with Lewis acid type catalysts containing fluorine or chlorine atoms. The copolymers consist mainly of oxymethylene sequences separated by cycloalkylene units containing oxygen in the ring. Terpolymers are contemplated in which the termonomer units are derived from such monomers capable of copolymerizing with trioxane as ethylene oxide, dioxolane, 2,4-dimethyldioxolane, and so on.

The present invention refers to new polyoxymethylenic copolymers, consisting mainly of recurring —CH$_2$O— units and characterized by a high thermal stability.

Heat-stable polyoxymethylene copolymers obtained by copolymerizing trioxane with particular monomers, such as cyclic anhydrides or epoxides are already known. In this case the copolymers contain —O—CH$_2$—CH$_2$— units in the chain and are characterized by a remarkably higher stability than polyoxymethylene homopolymers.

The new copolymer of the present invention is prepared by copolymerizing trioxane with a cyclic formal; the comonomer employed is 3,5,8-trioxa-bicyclo-[4,4,0]-decane and is made up of a metadioxane ring condensed on the tetrahydropyrane nucleus:

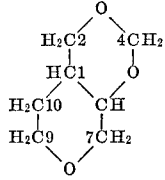

The use of 3,5,8-trioxa-bicyclo-[4,4,0]-decane as comonomer in the polymerization of trioxane is particularly advantageous, owing not only to the characteristics of thermal stability of the copolymer, but also because the monomer can be easily synthetized from low cost products. In fact, raw materials suitable for the preparation are butadiene and formaldehyde (as aqueous solution or as paraformaldehyde) which are condensed according to a double Prins reaction in the presence of acid catalysts:

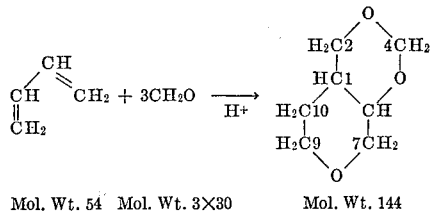

Mol. Wt. 54    Mol. Wt. 3×30    Mol. Wt. 144

The product can be easily separated from the reactants by crystallization.

As can be seen from the stoichiometry of the reaction, about ⅔ of the total weight of the monomer is derived from butadiene, which is a product available at low cost, and about ⅗ from formaldehyde, which is a product available at even lower cost than butadiene.

Under the condtions selected for the polymerization, said compound reacts by opening of a C—O bond in the metadioxane ring between the number 3 oxygen and 4 carbon atom and is added to the growing polyoxymethylenic chain. The chain segments wherein only oxymethylenic —OCH$_2$— sequences are present, are, therefore, separated by units yielding in the chain sequences of at least two adjacent carbon atoms. The copolymer obtained according to this invention consists mainly of oxymethylene sequences separated by cycloalkylene units containing oxygen in the ring:

$$-(OCH_2)_m-OCH_2-\overset{H}{\underset{H_2C10}{C}}-\overset{H}{\underset{H_2C9-O}{C}}-OCH_2-(OCH_2)_n-$$

wherein *m* and *n* are integers ranging from 1 to 100.

The said comonomer is added to trioxane in amounts varying from 0.1 to 50 mols, preferably from 0.1 to 15 mols per 100 mols of trioxane. This comonomer can be used both alone and admixed with other comonomers capable of copolymerizing with trioxane, such as ethylene oxide,

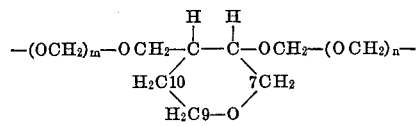

dioxolane

2,4-dimethyl-dioxolane

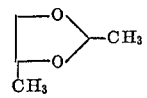

4-methyl-metadioxane

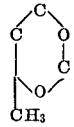

2,3-ethylene-dioxy-dioxane

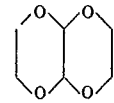

hexahydrobenzo-trioxyepane

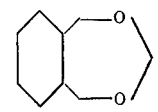

hexahydro-benzodioxolane

The catalysts used for preparing these copolymers are the Lewis acids which are known in the art for polymerizing trioxane. Suitable catalysts, are for instance, compounds containing fluorine or chlorine atoms, such as antimony fluorides, antimony fluoroborate, phosphporus pentachloride and iron chloride. However, the preferred catalyst for the copolymerization is BF$_3$ alone or complexed with organic compounds wherein oxygen or sulphur is the electron donor atom, such as $BF_3 \cdot Et_2O$ and $BF_3Me_2S$. Equally preferred are $FeCl_3$ and $SnCl_4$.

The amount of catalyst ranges from 0.001 to 0.01% by weight of trioxane.

The trioxane used must be anhydrous or substantially anhydrous.

The polymerization is carried out preferably in the absence of solvents or in hydrocarbons solvent such as benzene, cyclohexane, chloroalkanes (such as methylene chloride), or nitroarenes (such as nitrobenzene).

The reaction temperature is between 30° and 120° C., preferably between 50° and 90° C.

The copolymers produced according to this invention consist mainly of oxymethylene sequences interrupted by cyclo-oxyalkylene units in a ratio of oxymethylene units to cyclo-oxyalkylene units from about 6 to 1 to 1000 to 1.

The polymeric products obtained are solid and show a melting point lower than that of the polyoxymethylene homopolymer, preferably between 150° and 170° C.

Example 125 g. trioxane, which was made anhydrous by heating at the boiling point over a sodium-potassium alloy, are distilled under nitrogen and condensed into a 250 cc. flask provided with a side cock and stirrer. When distillation is completed, 4.5 g. of 3,5,8-trioxa-bicyclo-[4,4,0]decane are added and the mass is heated up to 70° C. till a homogeneous solution is obtained. With the aid of a hypodermic syringe, 1 cc. of a solution consisting of 0.07 M of $BF_3Et_2O$ in nitrobenzene is added. The polymerization is thus started and leads to gradual formation of a polymer compact mass.

After 1 hour at 70° C. the polymerization is stopped by adding an excess of methanol. The polymer is reduced to a finely divided powder and is washed, first with hot ammonia solution and then with acetone. After drying in a vacuum with the aid of a mechanical pump, 70 g. of copolymer are weighed.

A sample of the copolymer containing 0.5% N-phenyl-beta-naphthylamine is heated under vacuum at 180° C. for 2 hours in order to remove the unstable fraction corresponding to 13%. The residue is examined by thermogravimetric balance at 225° C. under nitrogen. The weight loss measured at 225° C. is not higher than 0.05% per minute.

The intrinsic viscosity of the copolymer in dimethylformamide at 150° C. is 0.8.

As will be apparent, various changes in details may be made in the practice of this invention without departing from the spirit thereof. It is intended, therefore, to include in the scope of the appended claims, all such modifications in details as will be obvious to those skilled in the art from the description and working example given therein.

What is claimed is:
1. Polymers containing units of the following formula

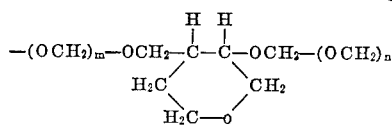

wherein *m* and *n* are integers ranging from 1 to 100.

2. Polymers according to claim 1 in which the ratio of oxymethylene units to cyclo-oxyalkylene units is from 6:1 to 1000:1.

3. Polymers according to claim 1 in which at least some of the oxymethylene units are derived from trioxane.

4. Polymers according to claim 1 in which at least some of the cyclo-oxyalkylene units are derived from 3,5,8-trioxabicyclo[4,4,0] decane.

5. Polymer according to claim 1 in which at least some of the oxymethylene units are derived from trioxane and some of the cyclo-oxyalkylene units are derived from 3,5,8-bicyclo[4,4,0] decane.

6. Polymers according to claim 1 in which at least some of the —($OCH_2$)— units are derived from trioxane and at least some of the

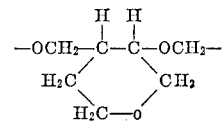

units are derived from 3,5,8-trioxa-bicyclo-[4,4,0]decane.

7. High molecular weight polyoxymethylenic copolymers essentially made up of sequences of oxymethylenic units separated by cyclo-oxyalkylene units derived from 3,5,8-trioxa-bicyclo[4,4,0]decane through opening of the metadioxane ring thereof, and in which the ratio of oxymethylene units to said cyclo-oxyalkylene units is from 6:1 to 1000:1.

8. Polymers according to claim 7, which also contain units derived from a monomer selected from the group consisting of dioxolane, ethylene-oxide, 2,4-dimethyl-dioxolane, 4 - methyl - metadioxane, 2,3 - ethylene - dioxydioxane, hexahydrobenzo-trioxyepane, hexahydrobenzodioxolane.

9. A process for preparing polyoxymethylene copolymers comprising reacting trioxane with 3,5,8-trioxabicyclo-[4,4,0]decane in the presence of catalysts of the Lewis acid type containing a halogen selected from the group consisting of chlorine and fluorine, at a temperature between 30° and 120° C.

10. A process according to claim 9, in which the reaction temperature is between 50° and 90° C.

11. A process according to claim 9, characterized in that the catalyst used is selected from the group consisting of $BF_3 \cdot (C_2H_5)_2O$, $BF_3 \cdot (CH_3)_2$, $FeCl_3$ and $SnCl_4$.

12. A process according to claim 9, characterized in that the amount of catalyst used is from 0.001 to 0.01% by weight of trioxane.

13. A process according to claim 9, in which a comonomer selected from the group consisting of dioxolane, ethylene-oxide, 2,4-dimethyl-dioxolane, 4-methyl-metadioxane, 2,3-ethylene-dioxy-dioxane, hexahydrobenzo-trioxyepane and hexahydrobenzodioxolane is reacted.

References Cited

UNITED STATES PATENTS

| | | | |
|---|---|---|---|
| 3,252,939 | 5/1966 | Small | 260—67 |
| 3,256,246 | 6/1966 | Gutweiler et al. | 260—67 |
| 3,288,756 | 11/1966 | Buckley | 260—67 |
| 3,321,443 | 5/1967 | Brinker et al. | 260—67 |

WILLIAM M. SHORT, *Primary Examiner.*

L. M. PHYNES, *Assistant Examiner.*

U.S. Cl. X.R.

260—2, 88.3

UNITED STATES PATENT OFFICE
CERTIFICATE OF CORRECTION

Patent No. 3,422,073                                    January 14, 1969

Gianfranco Pregaglia et al.

It is certified that error appears in the above identified patent and that said Letters Patent are hereby corrected as shown below:

Column 4, line 43, "$BF_3 \cdot (CH_3)_2$" should read -- $BF_3 \cdot (CH_3)_2 S$ --.

Signed and sealed this 17th day of March 1970.

(SEAL)
Attest:

Edward M. Fletcher, Jr.                    WILLIAM E. SCHUYLER, JR.
Attesting Officer                              Commissioner of Patents